US012418658B2

(12) United States Patent
Oh et al.

(10) Patent No.: US 12,418,658 B2
(45) Date of Patent: Sep. 16, 2025

(54) METHOD FOR DECODING IMMERSIVE VIDEO AND METHOD FOR ENCODING IMMERSIVE VIDEO (71) Applicant: Electronics and Telecommunications Research Institute, Daejeon (KR)

(72) Inventors: Kwan-Jung Oh, Daejeon (KR); Gwangsoon Lee, Daejeon (KR); Euee S. Jang, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/628,462

(22) Filed: Apr. 5, 2024

(65) Prior Publication Data
US 2024/0251086 A1    Jul. 25, 2024

Related U.S. Application Data (62) Division of application No. 17/961,028, filed on Oct. 6, 2022, now abandoned.

(30) Foreign Application Priority Data

Oct. 6, 2021  (KR) .................. 10-2021-0132657
Oct. 6, 2022  (KR) .................. 10-2022-0127640

(51) Int. Cl.
H04N 19/136    (2014.01)
H04N 19/177    (2014.01)

(52) U.S. Cl.
CPC ......... H04N 19/136 (2014.11); H04N 19/177 (2014.11)

(58) Field of Classification Search
None
See application file for complete search history.

(56) References Cited

U.S. PATENT DOCUMENTS

| | | |
|---|---|---|
| 2019/0266786 A1 | 8/2019 | Kobayashi et al. |
| 2020/0236302 A1 | 7/2020 | Park |
| 2020/0302571 A1* | 9/2020 | Schwarz ................ G06T 7/70 |
| 2021/0014494 A1 | 1/2021 | Lim et al. |
| 2021/0105451 A1* | 4/2021 | Oyman ................ H04N 19/597 |
| 2023/0007277 A1* | 1/2023 | Salahieh ............... H04N 19/132 |
| 2023/0186522 A1* | 6/2023 | Dore ...................... G06T 15/04 |
| | | 345/419 |

FOREIGN PATENT DOCUMENTS

| | | |
|---|---|---|
| KR | 10-2005-0121412 | 12/2005 |
| KR | 10-2022-0011688 | 1/2022 |

* cited by examiner

Primary Examiner — Kaitlin A Retallick
(74) Attorney, Agent, or Firm — KILE PARK REED & HOUTTEMAN PLLC

(57) ABSTRACT

A method of encoding an immersive video according to the present disclosure includes determining whether an input image is a first type, converting the input image into the first type when the input image is a second type different from the first type, encoding a converted image, and generating metadata for the encoded image.

12 Claims, 9 Drawing Sheets

METHOD FOR DECODING IMMERSIVE VIDEO AND METHOD FOR ENCODING IMMERSIVE VIDEO

CROSS-REFERENCE TO RELATED APPLICATIONS

This is a divisional application of U.S. patent application Ser. No. 17/961,028 filed Oct. 6, 2022 (now pending), the disclosure of which is incorporated herein by reference in its entirety. U.S. patent application Ser. No. 17/961,028 claims priority to and benefits of Korean Patent Application Nos. 10-2022-0127640 filed Oct. 6, 2022, and 10-2021-0132657 filed Oct. 6, 2021, under 35 U.S.C. § 119 in the Korean Intellectual Property Office, the entire contents of which are incorporated herein by reference.

TECHNICAL FIELD

The present disclosure relates to a method for encoding/decoding an immersive video which supports motion parallax for a rotation and translation motion.

BACKGROUND ART

A virtual reality service is evolving in a direction of providing a service in which a sense of immersion and realism are maximized by generating an omnidirectional image in a form of an actual image or CG (Computer Graphics) and playing it on HMD, a smartphone, etc. Currently, it is known that 6 Degrees of Freedom (DoF) should be supported to play a natural and immersive omnidirectional image through HMD. For a 6DoF image, an image which is free in six directions including (1) left and right rotation, (2) top and bottom rotation, (3) left and right movement, (4) top and bottom movement, etc. should be provided through a HMD screen. But, most of the omnidirectional images based on an actual image support only rotary motion. Accordingly, a study on a field such as acquisition, reproduction technology, etc. of a 6DoF omnidirectional image is actively under way.

DISCLOSURE

Technical Problem

The present disclosure is to provide a method for encoding/decoding an immersive video in a unit of an object.

The present disclosure is to provide a method for encoding/decoding an immersive video with which heterogeneous images are combined.

The present disclosure is to provide a method for encoding/decoding attribute information on each of heterogeneous images.

The technical objects to be achieved by the present disclosure are not limited to the above-described technical objects, and other technical objects which are not described herein will be clearly understood by those skilled in the pertinent art from the following description.

Technical Solution

A method for encoding an immersive video according to the present disclosure includes determining whether an input image is a first type, converting the input image into the first type when the input image is a second type different from the first type, encoding a converted image, and generating metadata for the encoded image.

A method for decoding an immersive video according to the present disclosure includes acquiring a plurality of bitstreams through demultiplexing, decoding at least one of the plurality of bitstreams, and rendering an immersive video based on a decoded image and decoded metadata.

In a method for encoding/decoding an immersive video according to the present disclosure, the metadata may include video type information for the encoded/decoded image.

In a method for encoding/decoding an immersive video according to the present disclosure, the encoded/decoded image is an image for a predetermined object and the metadata may include dynamic information representing a dynamic characteristic of the object.

In a method for encoding/decoding an immersive video according to the present disclosure, the dynamic information may indicate whether the object is in a static state or in a dynamic state within a predetermined period.

In a method for encoding/decoding an immersive video according to the present disclosure, the predetermined period is a service period of the encoded/decoded image and the metadata may further include duration information representing the service period.

In a method for encoding/decoding an immersive video according to the present disclosure, the predetermined period is represented in a unit of GOP (Group of Pictures) and the dynamic information may be encoded/decoded per the predetermined period within a service period of the encoded/decoded image.

Technical Effects

According to the present disclosure, a method of encoding/decoding an immersive video in a unit of an object may be provided.

According to the present disclosure, a method of encoding/decoding an immersive video with which heterogeneous images are combined may be provided.

According to the present disclosure, a method of encoding/decoding attribute information on each of heterogeneous images may be provided.

Effects achievable by the present disclosure are not limited to the above-described effects, and other effects which are not described herein may be clearly understood by those skilled in the pertinent art from the following description.

DESCRIPTION OF DIAGRAMS

BEST MODE

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An immersive video, when a user's watching position is changed, refers to an image that a viewport may be also dynamically changed. In order to implement an immersive video, a plurality of input images are required. Each of a plurality of input images may be referred to as a source image or a view image. A different view index may be assigned to each view image.

An immersive video may be classified into 3DoF (Degree of Freedom), 3DoF+, Windowed-6DoF or 6DoF type, etc. A 3DoF-based immersive video may be implemented by using only a texture image. On the other hand, in order to render an immersive video including depth information such as 3DoF+ or 6DoF, etc., a depth image as well as a texture image is also required.

It is assumed that embodiments described below are for immersive video processing including depth information such as 3DoF+ and/or 6DoF, etc. In addition, it is assumed that a view image is configured with a texture image and a depth image.

Figure 1:
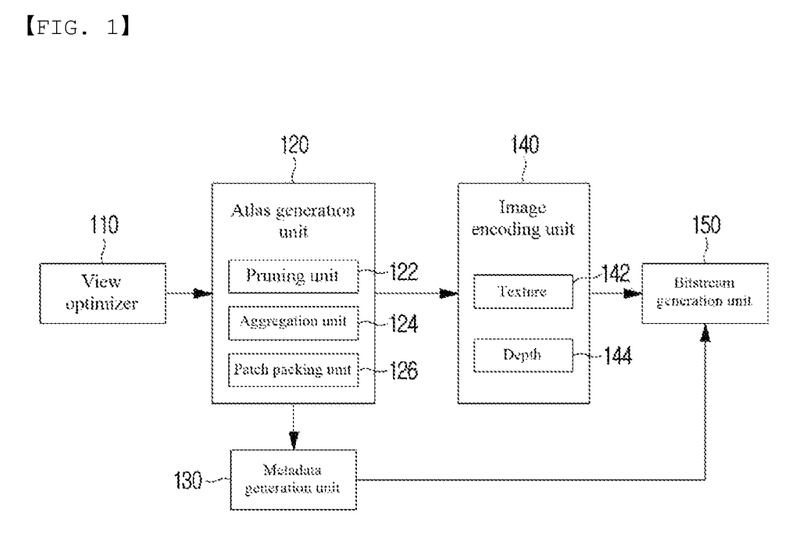
FIG. 1 is a block diagram of an immersive video processing device according to an embodiment of the present disclosure.

FIG. 1 is a block diagram of an immersive video processing device according to an embodiment of the present disclosure.

In reference to FIG. 1, an immersive video processing device according to the present disclosure may include a view optimizer 110, an atlas generation unit 120, a metadata generation unit 130, an video encoding unit 140 and a bitstream generation unit 150.

An immersive video processing device receives a plurality of pairs of images, a camera internal variable and a camera external variable as an input value to encode an immersive video. Here, a plurality of pairs of images include a texture image (Attribute component) and a depth image (Geometry component). Each pair may have a different view. Accordingly, a pair of input images may be referred to as a view image. Each of view images may be divided by an index. In this case, an index assigned to each view image may be referred to as a view or a view index.

A camera internal variable includes a focal distance, a position of a principal point, etc. and a camera external variable includes a position, a direction, etc. of a camera. A camera internal variable and a camera external variable may be treated as a camera parameter or a view parameter.

A view optimizer 110 partitions view images into a plurality of groups. As view images are partitioned into a plurality of groups, independent encoding processing per each group may be performed. In an example, view images filmed by N spatially consecutive cameras may be classified into one group. Thereby, view images that depth information is relatively coherent may be put in one group and accordingly, rendering quality may be improved.

In addition, by removing dependence of information between groups, a spatial random access service which performs rendering by selectively bringing only information in a region that a user is watching may be made available.

Whether view images will be partitioned into a plurality of groups may be optional.

In addition, a view optimizer 110 may classify view images into a basic image and an additional image. A basic image represents an image which is not pruned as a view image with a highest pruning priority and an additional image represents a view image with a pruning priority lower than a basic image.

A view optimizer 110 may determine at least one of view images as a basic image. A view image which is not selected as a basic image may be classified as an additional image.

A view optimizer 110 may determine a basic image by considering a view position of a view image. In an example, a view image whose view position is the center among a plurality of view images may be selected as a basic image.

Alternatively, a view optimizer 110 may select a basic image based on a camera parameter. Specifically, a view optimizer 110 may select a basic image based on at least one of a camera index, a priority between cameras, a position of a camera or whether it is a camera in a region of interest.

In an example, at least one of a view image with a smallest camera index, a view image with a largest camera index, a view image with the same camera index as a predefined value, a view image filmed by a camera with a highest priority, a view image filmed by a camera with a lowest priority, a view image filmed by a camera at a predefined position (e.g., a central position) or a view image filmed by a camera in a region of interest may be determined as a basic image.

Alternatively, a view optimizer 110 may determine a basic image based on quality of view images. In an example, a view image with highest quality among view images may be determined as a basic image.

Alternatively, a view optimizer 110 may determine a basic image by considering an overlapping data rate of other view images after inspecting a degree of data redundancy between view images. In an example, a view image with a highest overlapping data rate with other view images or a view image with a lowest overlapping data rate with other view images may be determined as a basic image.

A plurality of view images may be also configured as a basic image.

An Atlas generation unit 120 performs pruning and generates a pruning mask. And, it extracts a patch by using a pruning mask and generates an atlas by combining a basic image and/or an extracted patch. When view images are partitioned into a plurality of groups, the process may be performed independently per each group.

A generated atlas may be composed of a texture atlas and a depth atlas. A texture atlas represents a basic texture image and/or an image that texture patches are combined and a depth atlas represents a basic depth image and/or an image that depth patches are combined.

An atlas generation unit 120 may include a pruning unit 122, an aggregation unit 124 and a patch packing unit 126.

A pruning unit 122 performs pruning for an additional image based on a pruning priority. Specifically, pruning for an additional image may be performed by using a reference image with a higher pruning priority than an additional image.

A reference image includes a basic image. In addition, according to a pruning priority of an additional image, a reference image may further include other additional image.

Whether an additional image may be used as a reference image may be selectively determined. In an example, when an additional image is configured not to be used as a reference image, only a basic image may be configured as a reference image.

On the other hand, when an additional image is configured to be used as a reference image, a basic image and other additional image with a higher pruning priority than an additional image may be configured as a reference image.

Through a pruning process, redundant data between an additional image and a reference image may be removed. Specifically, through a warping process based on a depth image, data overlapped with a reference image may be removed in an additional image. In an example, when a depth value between an additional image and a reference image is compared and that difference is equal to or less than a threshold value, it may be determined that a corresponding pixel is redundant data.

As a result of pruning, a pruning mask including information on whether each pixel in an additional image is valid or invalid may be generated. A pruning mask may be a binary image which represents whether each pixel in an additional image is valid or invalid. In an example, in a pruning mask, a pixel determined as overlapping data with a reference image may have a value of 0 and a pixel determined as non-overlapping data with a reference image may have a value of 1.

While a non-overlapping region may have a non-square shape, a patch is limited to a square shape. Accordingly, a patch may include an invalid region as well as a valid region. Here, a valid region refers to a region composed of non-overlapping pixels between an additional image and a reference image. In other words, a valid region represents a region that includes data which is included in an additional image, but is not included in a reference image. An invalid region refers to a region composed of overlapping pixels between an additional image and a reference image. A pixel/data included by a valid region may be referred to as a valid pixel/valid data and a pixel/data included by an invalid region may be referred to as an invalid pixel/invalid data.

An aggregation unit 124 combines a pruning mask generated in a frame unit in an intra-period unit.

In addition, an aggregation unit 124 may extract a patch from a combined pruning mask image through a clustering process. Specifically, a square region including valid data in a combined pruning mask image may be extracted as a patch. Regardless of a shape of a valid region, a patch is extracted in a square shape, so a patch extracted from a square valid region may include invalid data as well as valid data.

In this case, an aggregation unit 124 may repartition a L-shaped or C-shaped patch which reduces encoding efficiency. Here, a L-shaped patch represents that distribution of a valid region is L-shaped and a C-shaped patch represents that distribution of a valid region is C-shaped.

When distribution of a valid region is L-shaped or C-shaped, a region occupied by an invalid region in a patch is relatively large. Accordingly, a L-shaped or C-shaped patch may be partitioned into a plurality of patches to improve encoding efficiency.

For an unpruned view image, a whole view image may be treated as one patch. Specifically, a whole 2D image which develops an unpruned view image in a predetermined projection format may be treated as one patch. A projection format may include at least one of an Equirectangular Projection Format (ERP), a Cube-map or a Perspective Projection Format.

Here, an unpruned view image refers to a basic image with a highest pruning priority. Alternatively, an additional image that there is no overlapping data with a reference image and a basic image may be defined as an unpruned view image. Alternatively, regardless of whether there is overlapping data with a reference image, an additional image arbitrarily excluded from a pruning target may be also defined as an unpruned view image. In other words, even an additional image that there is data overlapping with a reference image may be defined as an unpruned view image.

A packing unit 126 packs a patch in a square image. In patch packing, deformation such as size transform, rotation, or flip, etc. of a patch may be accompanied. An image that patches are packed may be defined as an atlas.

Specifically, a packing unit 126 may generate a texture atlas by packing a basic texture image and/or texture patches and may generate a depth atlas by packing a basic depth image and/or depth patches.

For a basic image, a whole basic image may be treated as one patch. In other words, a basic image may be packed in an atlas as it is. When a whole image is treated as one patch, a corresponding patch may be referred to as a complete image (complete view) or a complete patch.

The number of atlases generated by an atlas generation unit 120 may be determined based on at least one of an arrangement structure of a camera rig, accuracy of a depth map or the number of view images.

A metadata generation unit 130 generates metadata for image synthesis. Metadata may include at least one of camera-related data, pruning-related data, atlas-related data or patch-related data.

Pruning-related data includes information for determining a pruning priority between view images. In an example, at least one of a flag representing whether a view image is a root node or a flag representing whether a view image is a leaf node may be encoded. A root node represents a view image with a highest pruning priority (i.e., a basic image) and a leaf node represents a view image with a lowest pruning priority.

When a view image is not a root node, a parent node index may be additionally encoded. A parent node index may represent an image index of a view image, a parent node.

Alternatively, when a view image is not a leaf node, a child node index may be additionally encoded. A child node index may represent an image index of a view image, a child node.

Atlas-related data may include at least one of size information of an atlas, number information of an atlas, priority information between atlases or a flag representing whether an atlas includes a complete image. A size of an atlas may include at least one of size information of a texture atlas and size information of a depth atlas. In this case, a flag representing whether a size of a depth atlas is the same as that of a texture atlas may be additionally encoded. When a size of a depth atlas is different from that of a texture atlas, reduction ratio information of a depth atlas (e.g., scaling-related information) may be additionally encoded. Atlas-related information may be included in a "View parameters list" item in a bitstream.

In an example, geometry_scale_enabled_flag, a syntax representing whether it is allowed to reduce a depth atlas, may be encoded/decoded. When a value of a syntax geometry_scale_enabled_flag is 0, it represents that it is not allowed to reduce a depth atlas. In this case, a depth atlas has the same size as a texture atlas.

When a value of a syntax geometry_scale_enabled_flag is 1, it represents that it is allowed to reduce a depth atlas. In this case, information for determining a reduction ratio of a depth atlas may be additionally encoded/decoded. In an example, geometry_scaling_factor_x, a syntax representing a horizontal directional reduction ratio of a depth atlas, and geometry_scaling_factor_y, a syntax representing a vertical directional reduction ratio of a depth atlas, may be additionally encoded/decoded.

An immersive video output device may restore a reduced depth atlas to its original size after decoding information on a reduction ratio of a depth atlas.

Patch-related data includes information for specifying a position and/or a size of a patch in an atlas image, a view image to which a patch belongs and a position and/or a size of a patch in a view image. In an example, at least one of position information representing a position of a patch in an atlas image or size information representing a size of a patch in an atlas image may be encoded. In addition, a source index for identifying a view image from which a patch is derived may be encoded. A source index represents an index of a view image, an original source of a patch. In addition, position information representing a position corresponding to a patch in a view image or position information representing a size corresponding to a patch in a view image may be encoded. Patch-related information may be included in an "Atlas data" item in a bitstream.

An image encoding unit 140 encodes an atlas. When view images are classified into a plurality of groups, an atlas may be generated per group. Accordingly, image encoding may be performed independently per group.

An image encoding unit 140 may include a texture image encoding unit 142 encoding a texture atlas and a depth image encoding unit 144 encoding a depth atlas.

A bitstream generation unit 150 generates a bitstream based on encoded image data and metadata. A generated bitstream may be transmitted to an immersive video output device.

Figure 2:
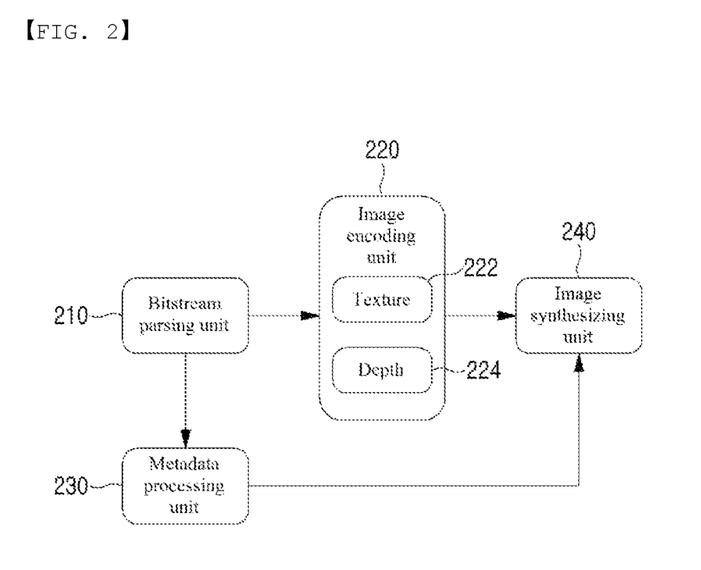
FIG. 2 is a block diagram of an immersive video output device according to an embodiment of the present disclosure.

FIG. 2 is a block diagram of an immersive video output device according to an embodiment of the present disclosure.

In reference to FIG. 2, an immersive video output device according to the present disclosure may include a bitstream parsing unit 210, an image decoding unit 220, a metadata processing unit 230 and an image synthesizing unit 240.

A bitstream parsing unit 210 parses image data and metadata from a bitstream. Image data may include data of an encoded atlas. When a spatial random access service is supported, only a partial bitstream including a watching position of a user may be received.

An image decoding unit 220 decodes parsed image data. An image decoding unit 220 may include a texture image decoding unit 222 for decoding a texture atlas and a depth image decoding unit 224 for decoding a depth atlas.

A metadata processing unit 230 unformats parsed metadata.

Unformatted metadata may be used to synthesize a specific view image. In an example, when motion information of a user is input to an immersive video output device, a metadata processing unit 230 may determine an atlas necessary for image synthesis and patches necessary for image synthesis and/or a position/a size of the patches in an atlas and others to reproduce a viewport image according to a user's motion.

An image synthesizing unit 240 may dynamically synthesize a viewport image according to a user's motion. Specifically, an image synthesizing unit 240 may extract patches required to synthesize a viewport image from an atlas by using information determined in a metadata processing unit 230 according to a user's motion. Specifically, a viewport image may be generated by extracing patches extracted from an atlas including information of a view image required to synthesize a viewport image and the view image in the atlas and synthesizing extracted patches.

Figure 3:
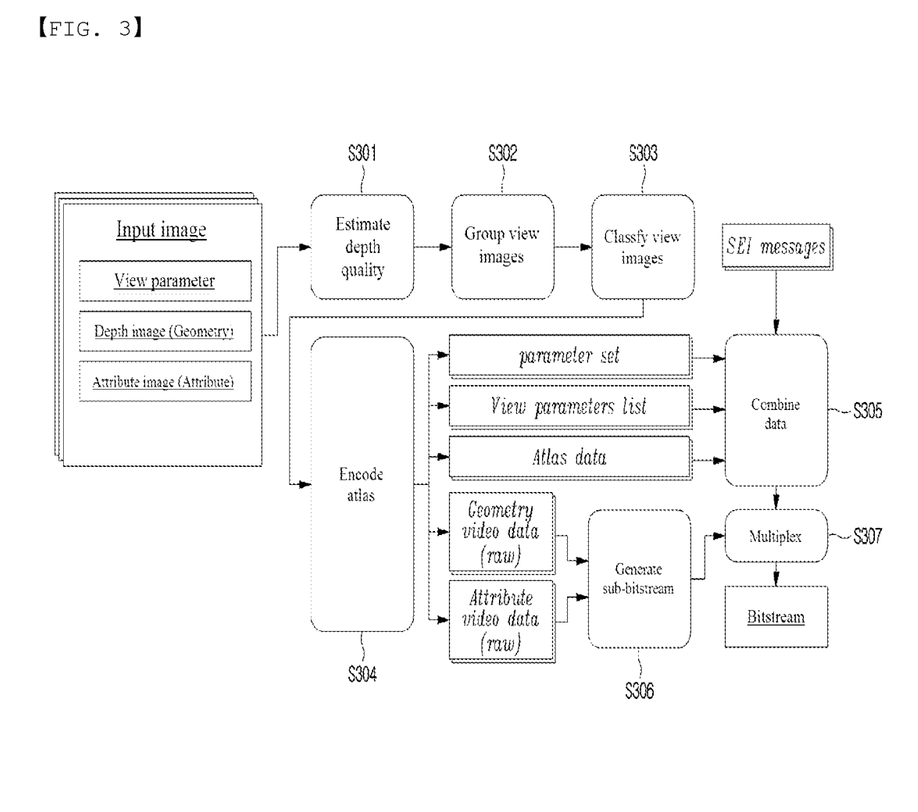
FIG. 3 is a flow chart of an immersive video processing method.
Figure 5:
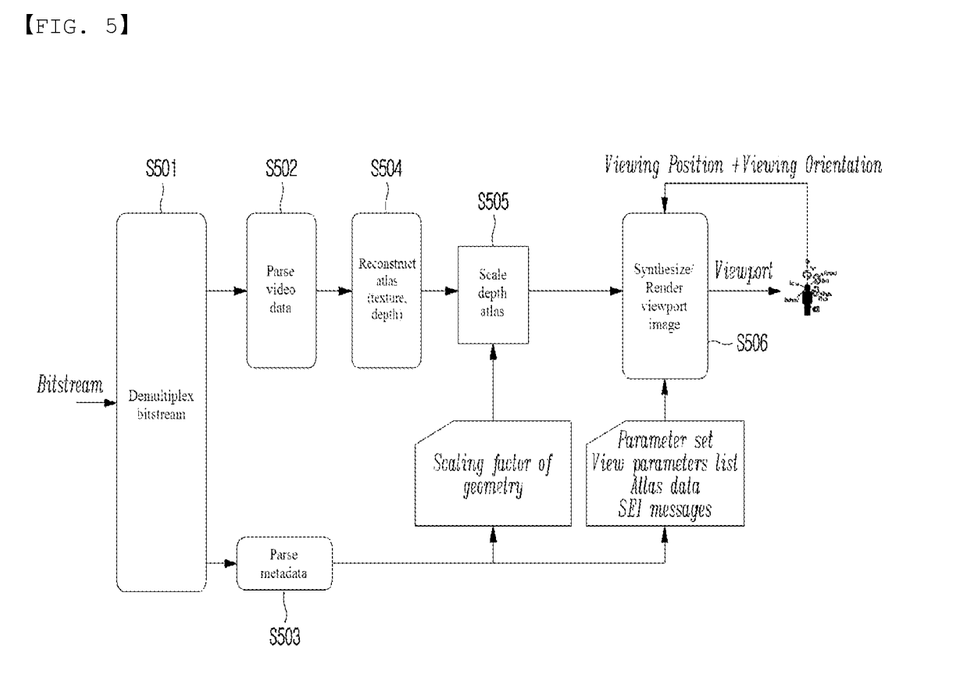
FIG. 5 is a flow chart of an immersive video output method.

FIGS. 3 and 5 show a flow chart of an immersive video processing method and an immersive video output method, respectively.

In the following flow charts, what is italicized or underlined represents input or output data for performing each step. In addition, in the following flow charts, an arrow represents processing order of each step. In this case, steps without an arrow indicate that temporal order between corresponding steps is not determined or that corresponding steps may be processed in parallel. In addition, it is also possible to process or output an immersive video in order different from that shown in the following flow charts.

An immersive video processing device may receive at least one of a plurality of input images, a camera internal variable and a camera external variable and evaluate depth map quality through input data S301. Here, an input image may be configured with a pair of a texture image (Attribute component) and a depth image (Geometry component).

An immersive video processing device may classify input images into a plurality of groups based on positional proximity of a plurality of cameras S302. By classifying input images into a plurality of groups, pruning and encoding may be performed independently between adjacent cameras whose depth value is relatively coherent. In addition, through the process, a spatial random access service that rendering is performed by using only information of a region a user is watching may be enabled.

But, the above-described S301 and S302 are just an optional procedure and this process is not necessarily performed.

When input images are classified into a plurality of groups, procedures which will be described below may be performed independently per group.

An immersive video processing device may determine a pruning priority of view images S303. Specifically, view images may be classified into a basic image and an additional image and a pruning priority between additional images may be set.

Subsequently, based on a pruning priority, an atlas may be generated and a generated atlas may be encoded S304. A process of encoding atlases is shown in detail in FIG. 4.

Figure 4:
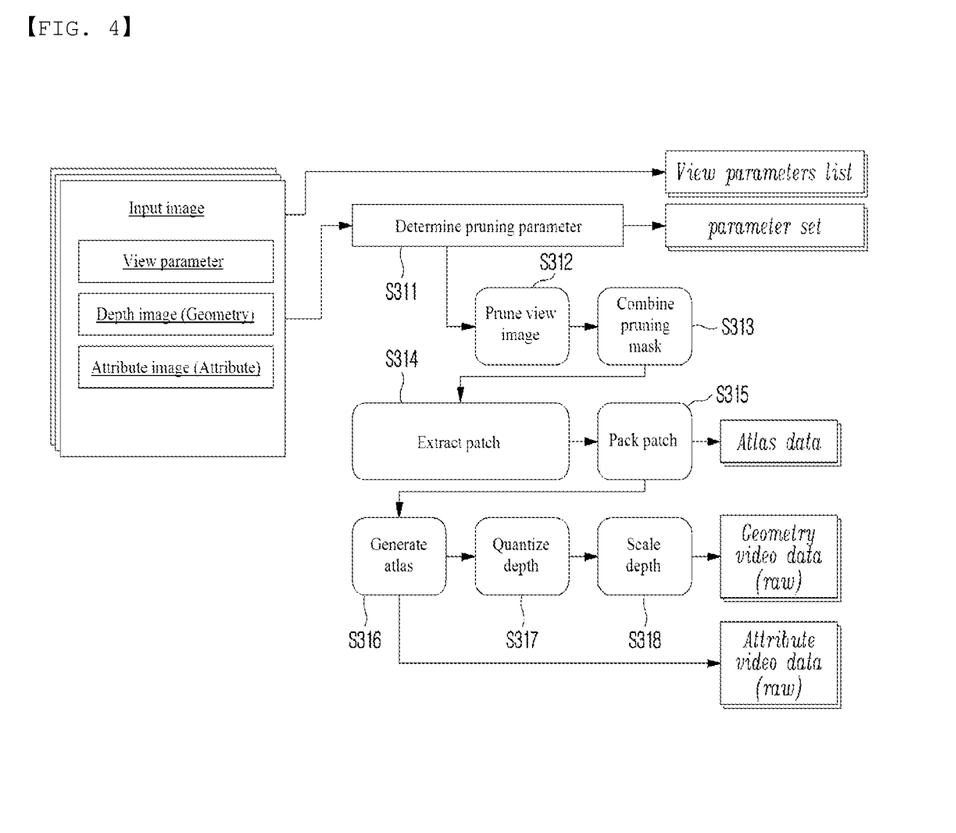
FIG. 4 is a flow chart of an atlas encoding process.

Specifically, a pruning parameter (e.g., a pruning priority, etc.) may be determined S311 and based on a determined pruning parameter, pruning may be performed for view images S312. As a result of pruning, a basic image with a highest priority is maintained as it is originally. On the other hand, through pruning for an additional image, overlapping data between an additional image and a reference image is removed. Through a warping process based on a depth image, overlapping data between an additional image and a reference image may be removed.

As a result of pruning, a pruning mask may be generated. If a pruning mask is generated, a pruning mask is combined in a unit of an intra-period S313. And, a patch may be extracted from a texture image and a depth image by using a combined pruning mask S314. Specifically, a combined pruning mask may be masked to texture images and depth images to extract a patch.

In this case, for an unpruned view image (e.g., a basic image), a whole view image may be treated as one patch.

Subsequently, extracted patches may be packed S315 and an atlas may be generated S316. Specifically, a texture atlas and a depth atlas may be generated.

In addition, an immersive video processing device may determine a threshold value for determining whether a pixel is valid or invalid based on a depth atlas S317. In an example, a pixel that a value in an atlas is smaller than a threshold valud may correspond to an invalid pixel and a pixel that a value is equal to or greater than a threshold valud may correspond to a valid pixel. A threshold value may be determined in a unit of an image or may be determined in a unit of a patch.

For reducing the amount of data, a size of a depth atlas may be reduced by a specific ratio S318. When a size of a depth atlas is reduced, information on a reduction ratio of a depth atlas (e.g., a scaling factor) may be encoded. In an immersive video output device, a reduced depth atlas may be restored to its original size through a scaling factor and a size of a texture atlas.

Metadata generated in an atlas encoding process (e.g., a parameter set, a view parameter list or atlas data, etc.) and SEI (Supplemental Enhancement Information) are combined S305. In addition, a sub bitstream may be generated by encoding a texture atlas and a depth atlas respectively S306. And, a single bitstream may be generated by multiplexing encoded metadata and an encoded atlas S307.

An immersive video output device demultiplexes a bitstream received from an immersive video processing device S501. As a result, video data, i.e., atlas data and metadata may be extracted respectively S502 and S503.

An immersive video output device may restore an atlas based on parsed video data S504. In this case, when a depth atlas is reduced at a specific ratio, a depth atlas may be scaled to its original size by acquiring related information from metadata S505.

When a user's motion occurs, based on metadata, an atlas required to synthesize a viewport image according to a user's motion may be determined and patches included in the atlas may be extracted. A viewport image may be generated and rendered S506. In this case, in order to synthesize generated patches, size/position information of each patch and a camera parameter, etc. may be used.

Each of elements constituting an input image may be classified as an entity. In an example, each of objects included in an input image may assign a different entity identifier (Entity Identifed). Here, an object may represent an object or a person, etc. included in an input image. Alternatively, when an input image is configured with a plurality of layers, a different entity identifier may be assigned to each layer. Alternatively, after partitioning an input image into a plurality of regions, a different entity identifier may be assigned to each of a plurality of regions. Entity setting may be selectively performed according to a user's need.

An encoder/a decoder according to the present disclosure may support object-based image encoding/decoding. Object-based encoding indicates that an encoder selects an object in an input image based on an object map and partially encodes a selected object.

Each of entities that a different entity identifier is assigned to an input image may be treated as one object. Accordingly, object-based image encoding/decoding may be referred to as entity-based image encoding/decoding.

An object map may be a binary image which represents a space occupied by a specific object in an input image. In an example, a value of a pixel corresponding to a region occupied by a specific object in an input image may be set as 1 and a value of a pixel corresponding to a region unoccupied by a specific object may be set as 0.

When object-based coding is supported, each of objects may be independently encoded/decoded. In other words, each of objects may be generated in a separate bitstream.

Figure 6:
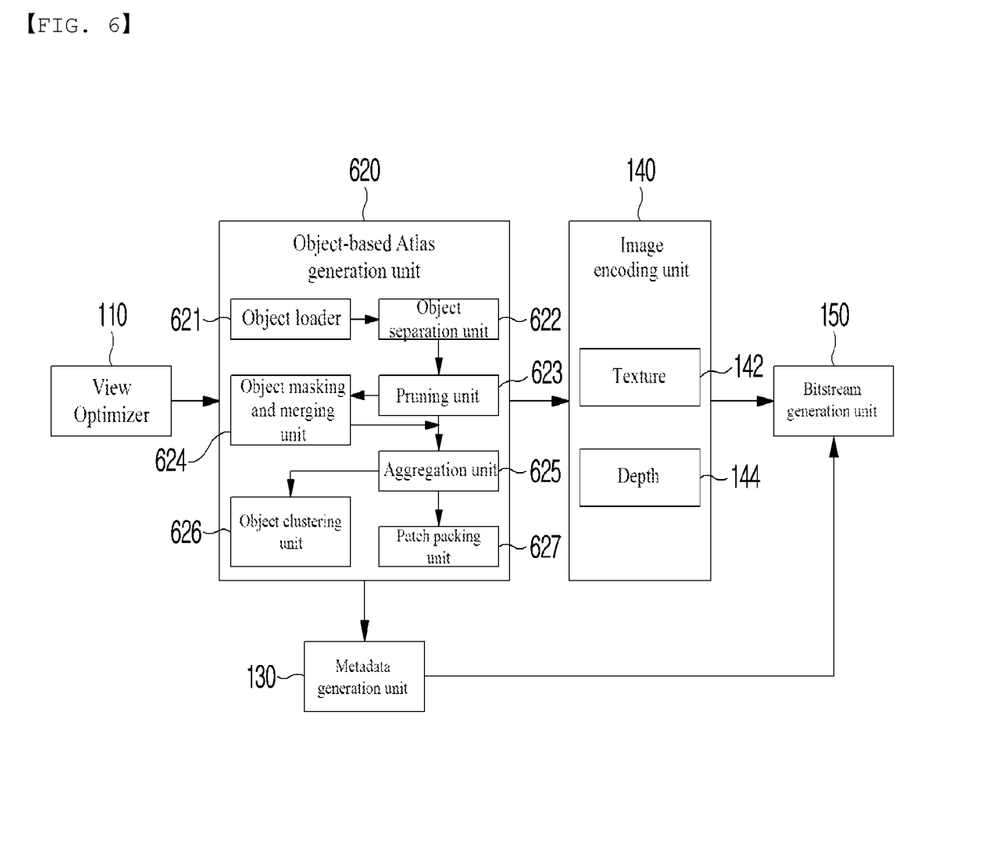
FIG. 6 is a block diagram of an immersive video processing device which supports object-based encoding.

FIG. 6 is a block diagram of an immersive video processing device which supports object-based encoding.

An encoder which supports object-based encoding may include an object-based atlas generation unit 620 instead of an atlas generation unit of the existing encoder.

An object-based atlas generation unit may include an object loader 621, an object separation unit 622, a pruning unit 623, an object masking and merging unit 624, an aggregation unit 625, an object clustering unit 626 and a patch packing unit 627.

An object loader 621 loads an object map. An object map may include information which identifies an object in an input image.

An object separation unit 622 separates a part corresponding to a specific object from an input image based on an object map. In an example, when object a and object b are included in an input image, a first image which includes only object a and a second image which includes only object b may be separated from the input image.

When an input image is separated into a plurality of images through an object separation unit 622, each of separated images may be independently input to a pruning unit 623.

A pruning unit 623 may perform pruning for each separated image. In this case, pruning may be performed based on a pruning priority between input images determined in a view optimizer 110.

An object masking and merging unit 624 may generate a pruning mask for an image including a specific object through a pruning result for a separated image.

An aggregation unit 625 may combine a pruning mask for an object in a unit of an intra-period.

An object clustering unit 626 extracts a patch based on a combined pruning mask image through a clustering process. Specifically, a square region including valid data in a combined pruning mask image may be extracted as a patch.

A patch packing unit 627 may generate an atlas for a specific object by packing extracted patches. Through the process, each of objects may constitute a different atlas. In an example, only patches derived from one object may be packed to one atlas. In other words, patches to which a different entity identifier (Entity ID) is assigned may not be packed to one atlas. Accordingly, when a plurality of atlases exist, patches packed to each atlas may be derived from a different object.

When an object-based encoding method is applied, a bitstream may be generated per object. Subsequently, a bitstream for each object may be multiplexed with metadata and transmitted to a decoder. Further, when an object-based encoding method is applied, an object map may be also encoded and transmitted to a decoder.

In a decoder, a bitstream per object may be decoded. And, based on an object map, decoded objects may be rendered on a space.

When object-based coding is applied, encoding/decoding may be performed independently and/or in parallel for each of objects. Accordingly, only some object(s) may be selectively parsed at a bitstream level or only some object(s) may be selectively encoded/decoded.

For it, a method of partitioning a picture into a plurality of tiles or a plurality of sub-pictures may be used. Specifically, encoding/decoding may be performed only for a tile or a sub-picture which includes an object to be encoded/decoded among a plurality of tiles or sub-pictures.

Further, for each of a plurality of tiles or sub-pictures, information for identifying an object included in a tile or a sub-picture (e.g., an object ID) may be additionally signaled. In this case, based on whether an object to be encoded/decoded is included in a tile or a sub-picture, whether a tile or a sub-picture will be explicitly encoded/decoded may be determined.

Meanwhile, a volumetric video filmed or generated by a 3DoF, 3DoF+ or 6DoF filming camera may be referred to as a MIV (Mpeg Immersive Video) type image. On the other hand, a volumetric video generated by a method different from above may be referred to as a non-MIV type image. In an example, a volumetric video such as point cloud, mesh or multi-view may be referred to as a non-MIV type image.

When an immersive video is configured with homogeneous MIV type images alone, there is a problem that it is difficult to independently control or utilize an attribute of an object embedded in a bitstream generated based on object-based coding.

In order to resolve the problem, a method of constituting an immersive video by combining heterogeneous type images may be considered. Specifically, when object-based coding is applied, an image for a first object in a MIV type and an image for a second object in a non-MIV type may be combined to constitute an immersive video.

For it, in an immersive video encoding process, when an input image is a non-MIV type image, a process of converting a non-MIV type image into a MIV type image should be accompanied.

Figure 7:
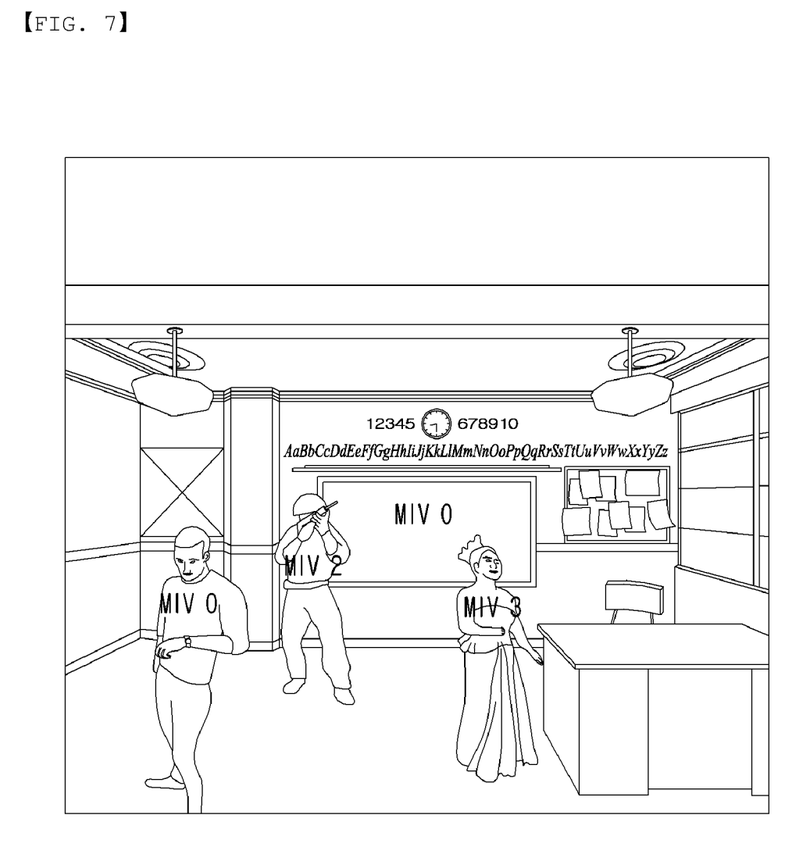
FIG. 7 illustrates an immersive video with which heterogeneous videos are combined.
Figure 8:
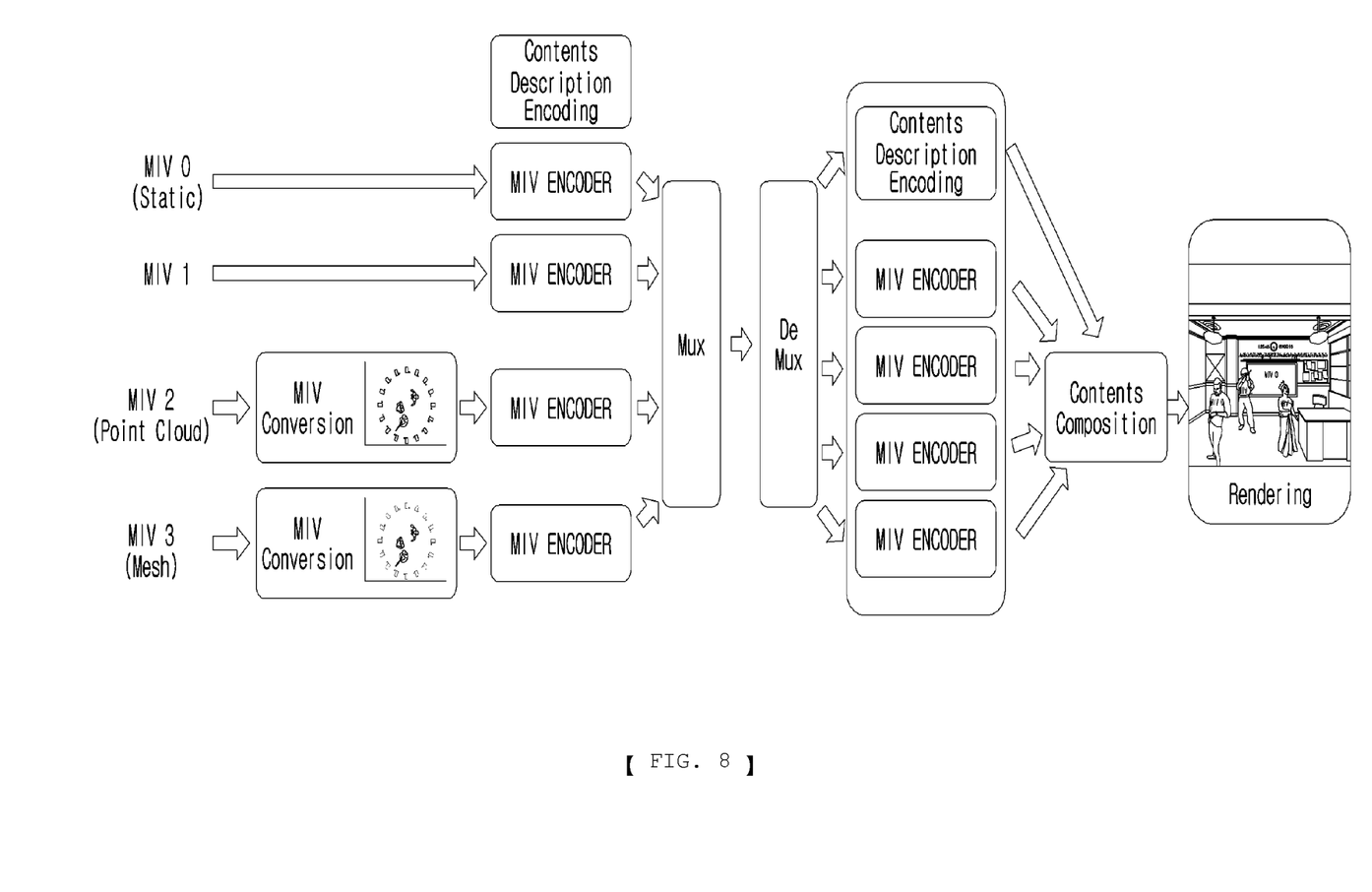
FIG. 8 is a flow chart which represents an encoding/decoding process of an immersive video shown in FIG. 7.

FIG. 7 represents an immersive video that heterogeneous type videos are combined and FIG. 8 is a flow chart which represents an encoding/decoding process of an immersive video shown in FIG. 7.

In an example shown in FIG. 7, it is assumed that each of videos for 3 persons constituting an immersive video (MIV1, MIV2 and MIV3) and a video for a background (MIV0) is set as an independent object. In addition, it is assumed that MIV0 and MIV1 are a MIV type video and MIV2 and MIV3 are a non-MIV type video. Specifically, it is assumed that MIV2 is a video in a point cloud type and MIV3 is a video in a mesh type.

Accordingly, MIV0 and MIV1 are mutually homogeneous, but are heterogeneous with MIV1 and MIV2.

In order to encode an immersive video that heterogeneous type videos are combined, a process of converting a non-MIV type video into a MIV type video may be accompanied.

In an example, as in an example shown in FIG. 8, MIV0 and MIV1, a MIV type video, are directly input to an encoder, whereas MIV2 and MIV3, a non-MIV type video, may be input to an encoder after being converted into a MIV type video.

Instead of inputting input videos to an independent encoder, after synthesizing input videos into one video, a synthesized video may be encoded through a single encoder. Specifically, in an example shown in FIG. 8, MIV0 and MIV1, a MIV type video, and MIV2 and MIV3, a non-MIV type video, may be synthesized into one MIV video. Specifically, first, a plurality of videos may be synthesized into one 2D image by projecting MIV0 and MIV1, a MIV type video, on a 2D plane according to a predefined projection type (e.g., ERP) and converting MIV2 and MIV3, a non-MIV type (e.g., PCC and/or Mesh) video, into a 2D image. Subsequently, a synthesized 2D video may be encoded by using a single encoder and in addition, a synthesized 2D video may be decoded by using a single decoder.

In addition, in order to support object-based coding, an object map for a synthesized 2D video (Entity Map) may be newly generated and encoded.

As above, in order to encode an immersive video that heterogeneous type videos are combined, an immersive video processing device may confirm a type of an input video and selectively perform conversion processing according to a confirmed video type.

As a non-MIV type video is converted into a MIV type video, a converted video has a unique attribute suitable for a MIV type. As above, information representing an attribute of a converted MIV type video (e.g., content description information) may be explicitly encoded and signaled as metadata.

After performing encoding processing for each of images input by an encoder, encoded bitstreams may be multiplexed. A multiplexed bitstream is separated through demultiplexing and each of separated bitstreams is input to a separate decoder. Subsequently, decoded data may be rendered according to an attribute set per object unit and/or object type.

As described above, in order to render an immersive video that heterogeneous type videos are combined, attribute information per object unit and/or object type needs to be explicitly encoded and signaled. In an example, attribute information as above may be content description information on an encoded video or may be encoded and signaled as a kind of metadata.

Content description information may include at least one of image type information, reflection property information, dynamic information, service period information, frame rate information or atlas size information.

Video type information may represent whether a video to be encoded/decoded is a MIV type or a non-MIV type, or whether a video to be encoded/decoded is converted into a MIV type. In an example, video type information may include at least one of a flag representing whether a video to be encoded/decoded is a MIV type or an index representing a type of a video to be encoded/decoded.

A value of a flag may be determined based on whether a video input to determine whether conversion processing is needed is a MIV type. In an example, in an example shown in FIG. 7, MIV0 and MIV1 are a MIV type video, so a value of a flag may be set as 0 for the two videos. On the other hand, MIV2 and MIV3 are a non-MIV type video, so a value of a flag may be set as 1 for the two videos.

An index representing a video type may represent at least one of a MIV type, PCC, mesh or RGBD. The index may be encoded only when a value of a flag is 1. Alternatively, instead of encoding/decoding the flag, only an index may be encoded/decoded.

Reflection property information represents at least one of whether a video to be encoded/decoded has a Lambertian reflection property or whether it has a partial reflection property. The reflection property information may include at least one of a 1-bit flag representing whether to have a Lambertian reflection property and a 1-bit flag representing whether a Lambertian reflection property is partially represented. Alternatively, the reflection property information may be index information and the index information may indicate one of not having a Lambertian reflection property, having a Lambertian reflection property and having a partial Lambertian reflection property. Reflection property information may be selectively encoded/decoded only when a video type is a predefined type or one of predefined types.

Dynamic information represents whether an object corresponding to an input video is a dynamic object or a static object. Division of a dynamic object and a static object may be determined based on whether a motion of a corresponding object occurs during a predetermined period. Here, a predetermined period may represent a service period of an input video.

Service period information represents a service period of an input video. Service period information may include at least one of start point information, end point information or duration information of a service period. In this case, only when an object corresponding to an input video is a dynamic object, service period information may be encoded/decoded.

Frame rate information represents a frame rate of an input video.

Content description information may be encoded/decoded in a sequence unit of an input video.

Alternatively, for content description information, at least one of video type information, reflection property information, dynamic information, service period information or frame rate information may be encoded/decoded in a unit of a sequence, whereas the rest may be encoded/decoded in a unit of a GOP (Group of Pictures).

Based on the content description information, only object(s) corresponding to a specific type of video may be partially encoded/decoded or only valid object(s) within a predetermined period may be partially encoded/decoded.

Figure 9:
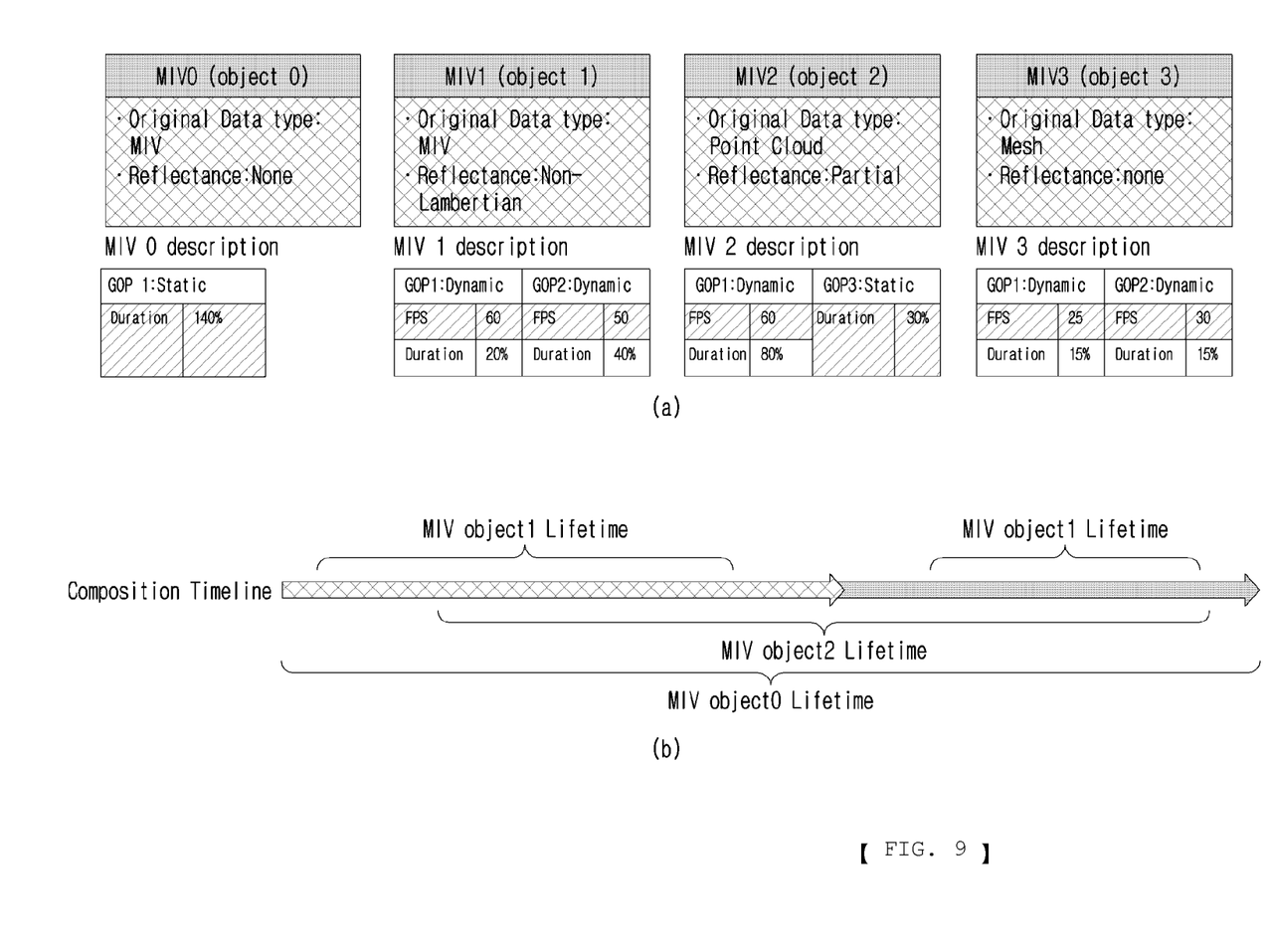
FIG. 9 illustrates an attribute value of each of input videos which may be represented by content description information.

FIG. 9 illustrates an attribute value of each of input videos which may be represented by content description information.

FIG. 9(*a*) schematizes an attribute of each video and FIG. 9(*b*) schematizes a service period of each video configured based on the attribute.

In an example shown in FIG. 9(*a*), it was illustrated that content type information and reflection property information are encoded/decoded in a unit of a sequence and dynamic information, service period information and frame rate information are encoded/decoded in a unit of a GOP.

In an example shown in FIG. 9(*a*), it was illustrated that MIV0 has a non-Lambertian reflection property as a MIV type video and that MIV1 has a Lambertian reflection property as a MIV type video.

In addition, it was illustrated that MIV2 has a partial Lambertian reflection property as a video in a point cloud type and that MIV3 has a non-Lambertian reflection property as a video in a mesh type.

Figure 10:
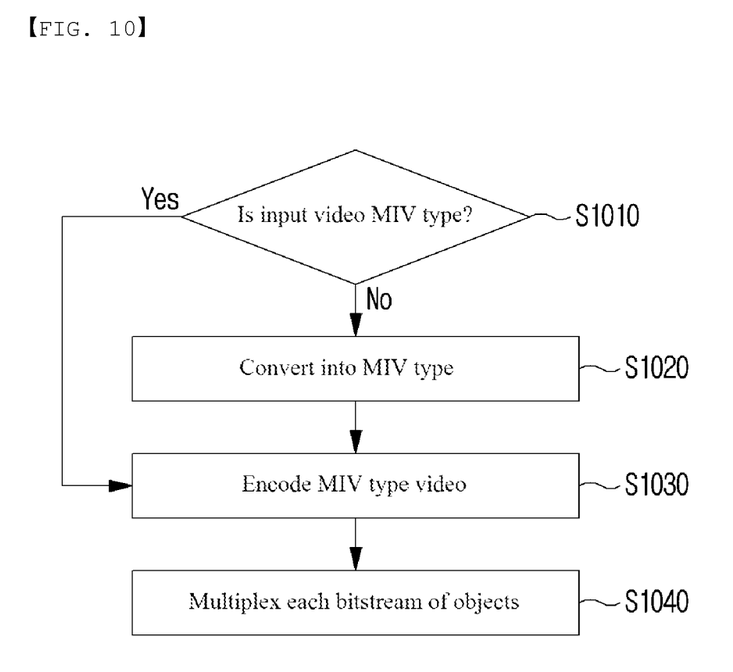
FIGS. 10 and 11 represent a flow chart of an encoding/decoding process of an immersive video with which heterogeneous videos are combined according to an embodiment of the present disclosure.
Figure 11:
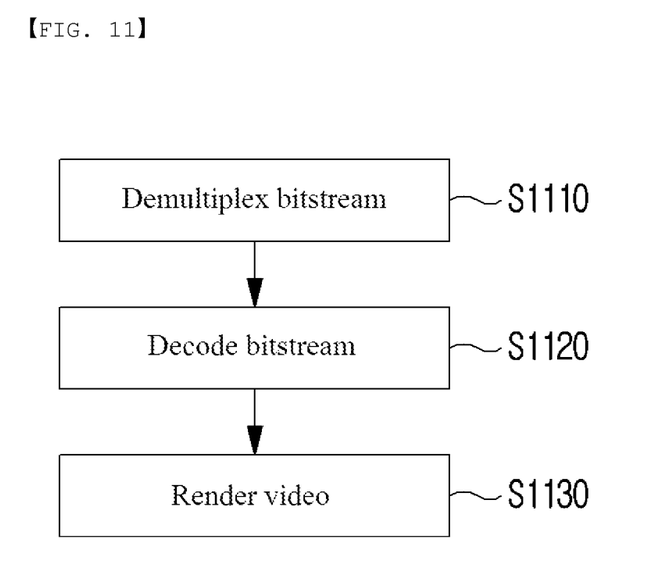

FIGS. 10 and 11 represent a flow chart of an encoding/decoding process of an immersive video that heterogeneous type videos are combined according to an embodiment of the present disclosure.

An immersive video processing device checks whether an input video is a MIV type video S1010. When an input video is a MIV type, an input MIV type video is directly input to an encoder. On the other hand, when an input video is not a MIV type, an input video is converted into a MIV type S1020 and a converted MIV type video is input to an encoder.

Subsequently, an input MIV type video is encoded S1030. Encoding of a MIV type video may include a process of atlas generation and encoding and metadata encoding.

The process may be repetitively/independently performed per object.

If a plurality of bitstreams are generated through the process, a plurality of bitstreams may be multiplexed S1040.

In an immersive video output device, through demultiplexing, received data may be separated into a plurality of bitstreams S1110. And then, a separated bitstream may be decoded S1120. The above-described decoding may include decoding for image data and decoding of metadata. Further, decoding may be also performed only for some bitstreams corresponding to an object selected among a plurality of bitstreams. In this case, when a plurality of objects are selected, decoding may be performed independently and/or in parallel for each of a plurality of bitstreams corresponding to selected objects.

Subsequently, a decoded image may be rendered by using generated metadata S1130. Through it, objects generated from heterogeneous type videos may constitute one scene.

A name of syntax elements introduced in the above-described embodiments is just temporarily given to describe embodiments according to the present disclosure. Syntax elements may be named differently from what was proposed in the present disclosure.

In the above-described embodiments, methods are described based on a flow chart as a series of steps or units, but the present disclosure is not limited to order of steps and some steps may occur simultaneously or in order different from other steps described above. In addition, those skilled in the pertinent art may understand that steps shown in a flow chart are not exclusive and other steps may be included, or one or more steps in a flow chart may be deleted without affecting a scope of the present disclosure.

The above-described embodiment includes examples of various aspects. All possible combinations for representing various aspects may not be described, but those skilled in the pertinent art may recognize that other combinations are possible. Accordingly, it may be said that the present disclosure includes all other replacements, modifications and changes which fall within the following scope of patent claims.

Embodiments according to the present disclosure described above may be recorded in a computer readable recoding medium by being implemented in a form of a program instruction which may be performed through a variety of computer components. The computer readable recoding medium may include a program instruction, a data file, a data structure, etc. alone or in combination. A program instruction recorded in the computer readable recoding medium may be specially designed and configured for the present disclosure or may be available by being notified to those skilled in a computer software art. An example of a computer readable recoding medium includes magnetic media such as a hard disk, a floppy disk and a magnetic tape, optical recording media such as a CD-ROM and a DVD, magneto-optical media such as a floptical disk and a hardware device which is specially configured to store and execute a program instruction such as ROM, RAM, a flash memory, etc. An example of a program instruction includes not only a machine language code as generated by a compiler, but also a high-level language code which may be executed by a computer with an interpreter, etc. The hardware device may be configured to operate as one or more software modules to perform processing according to the present disclosure and vice versa.

As above, the present disclosure was described by a limited embodiment and drawing and specific matters such as a specific component, etc., but it is just provided to help more general understanding of the present disclosure, and the present disclosure is not limited to the embodiments, and those skilled in the pertinent art from the following description may make a variety of modifications and variations from such a description.

Accordingly, an idea of the present disclosure should not be limited to the above-described embodiment, and all modifications equal or equivalent to a scope of this patent claim as well as a scope of patent claims described below fall within a scope of an idea of the present disclosure.

The invention claimed is:

1. A method of encoding an immersive video, the method comprising:
   receiving a plurality of videos which includes a first video capturing a first object and a second video capturing a second object;
   generating a 2D (two-dimensional) immersive video by combining the first video and the second video;
   generating first encoded video data by encoding a first object included in the 2D immersive video;
   generating second encoded video data by encoding a second object included in the two-dimensional immersive video including the second object; and
   generating a bitstream comprising the first encoded video data and the second encoded video data,
   wherein the 2D immersive video is generated by:
   in response to the first video being a first type, projecting the first video onto a 2D plane without converting the first video, and
   in response to the second video being a second type, which is different from the first type, projecting a converted second video onto the 2D plane, the converted second video being generated by converting the second video into the first type,
   wherein content description information is encoded for each of the first object and the second object, and
   wherein the content description information comprises video type information represents a type of a video including a corresponding object.

2. The method of claim 1,
   wherein the method further comprises:
   extracting a plurality of objects included in the 2D immersive video; and
   generating a plurality of atlases for the plurality of objects, wherein:
each of the plurality of atlases is generated by packing patches derived from one of the plurality of objects,
patches derived from the first object are packed into a first atlas,
packing patches derived from one of the first object and the second object to an atlas, in which patches derived from the other of the first object and the second object are packed, is not allowed,
the first encoded video data is generated by encoding the first atlas in which the patches derived from the first object are packed, and
the second encoded video data is generated by encoding a second atlas in which the patches derived from the second object are packed.

3. The method of claim 2, wherein:
the content description information further comprises dynamic information represents
whether an object is in a static state or in a dynamic state.

4. The method of claim 3, wherein:
the dynamic information is encoded for once for a predetermined period.

5. The method of claim 4, wherein:
the predetermined period is represented in a unit of GOP (Group of Pictures).

6. A method of decoding an immersive video, the method comprising:
receiving a bitstream including first encoded video data for a first object, second encoded video data for a second object and content description information;
reconstructing a first 2D immersive video including the first object by decoding the first encoded video data; and
reconstructing a second 2D immersive video including the second object by decoding the second encoded video data,
wherein the content description information is decoded for each of the first object and the second object,
wherein the content description information comprises video type information represents a type of a video from which a corresponding object originates,
wherein in response to the first object originating from a first video of a first type while the second object originates from a second video of a second type, a value of the video type information for the first object is different from a value of the video type information for the second object, and
wherein both the first encoded video data and the second encoded video data are decoded by a decoder for decoding videos of the first type.

7. The method of claim 6,
wherein:
the first encoded video data comprises encoded data of a first atlas in which patches derived from the first object are packed,
the second encoded video data comprises encoded data of a second atlas in which patches derived from the second object are packed, and
patches derived from one of the first object and the second object are not present in an atlas in which patches derived from the other of the first object and the second object are present.

8. The method of claim 7, wherein:
the content description information further comprises the dynamic information
represents whether an object is in a static state or in a dynamic state.

9. The method of claim 8, wherein:
the dynamic information is decoded for once for a predetermined period.

10. The method of claim 9, wherein:
the predetermined period is represented in a unit of GOP (Group of Pictures).

11. The method of claim 1, wherein the content description information further comprises at least one of light emitting feature information representing whether an object has a Lambertian featured surface.

12. The method of claim 4, wherein the content description information further comprises service period information representing the predetermined period, and
wherein the service period information is included in the content description information only when the dynamic information indicates that the corresponding object is in a dynamic state.

* * * * *